Patented Apr. 21, 1936

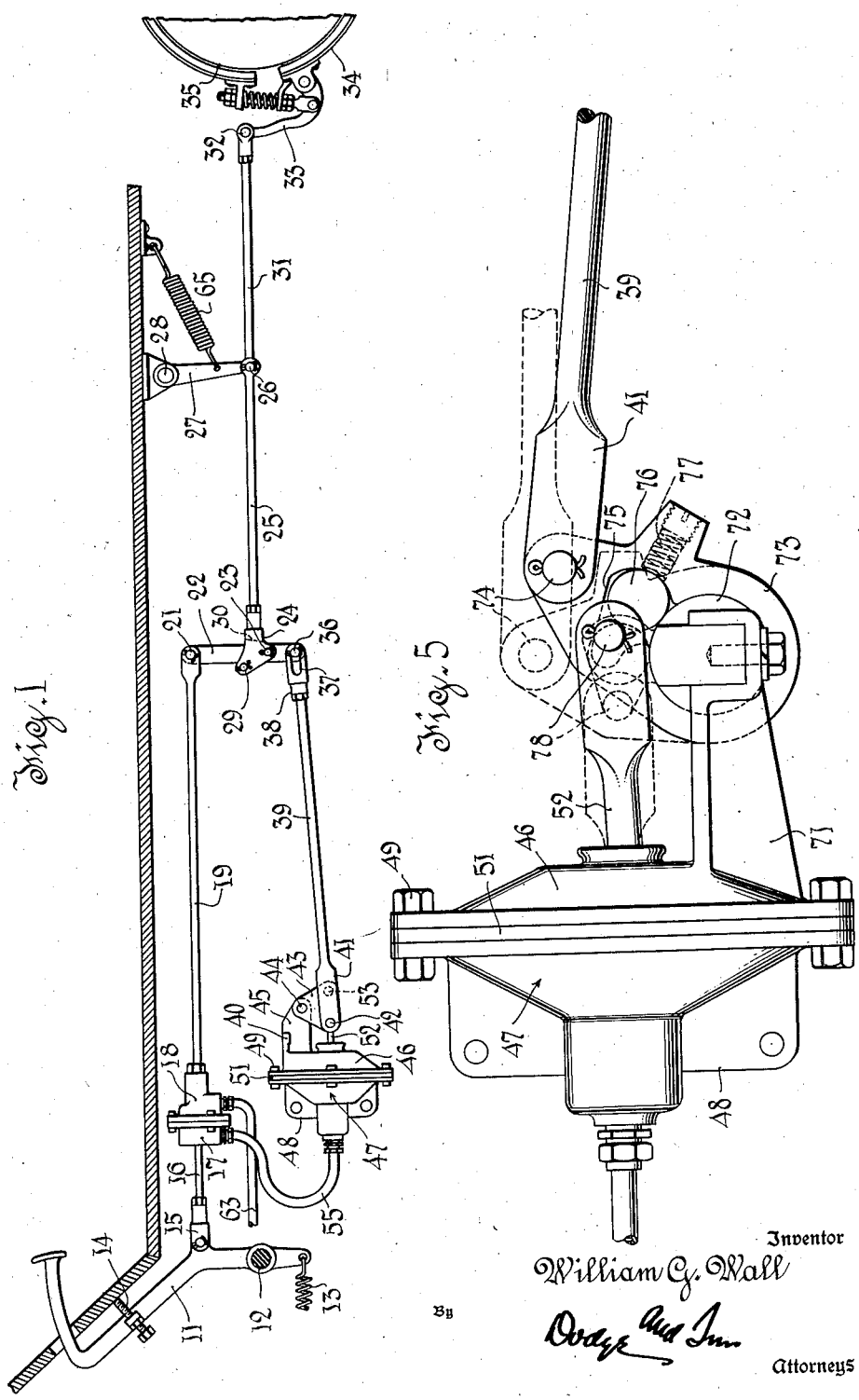

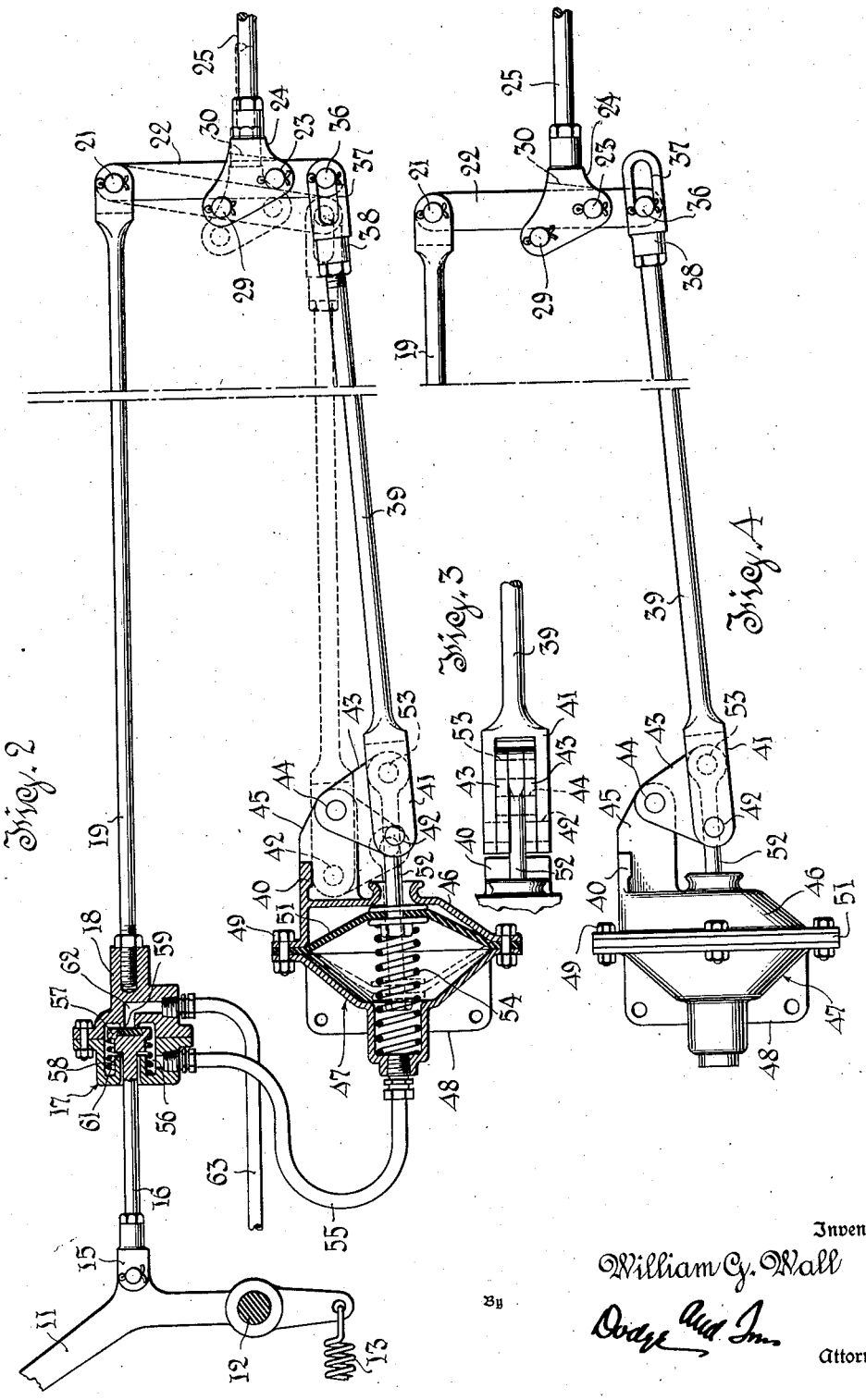

2,037,867

UNITED STATES PATENT OFFICE 2,037,867

VEHICLE BRAKE

William G. Wall, Indianapolis, Ind., assignor to The New York Air Brake Company, a corporation of New Jersey Application May 5, 1932, Serial No. 609,524

12 Claims. (Cl. 188—196)

This invention relates to power actuated devices for increasing the force ratio between an operator-operated member such as a pedal and a device actuated thereby, such as a brake, and will be described for purposes of illustration as applied to the brakes of an automobile, for which service the invention is primarily but not exclusively intended.

In all braking devices, and particularly in brakes of types in which the braking surface is substantially coextensive with the circumference of the brake drum, considerable slack travel of the brakes is necessary to ensure complete release and to avoid what are known as "dragging brakes." The higher the force ratio between the pedal and the brake, the greater the travel of the pedal must be for a given motion of the brakes in an applying direction, and since the permissible travel of the pedal is limited and the slack travel of the brakes must be substantial, the permissible force ratio between pedal and brakes is limited.

For the above reasons it has been found impracticable to design simple pedal actuated brakes for heavy vehicles, which would afford the desired rates of deceleration, and recourse has been had to so-called "boosters". Boosters are motors brought into action by depression of the brake pedal, and when active, functioning to assist in applying the brakes. Many forms are known, but they are similar in the inclusion of some form of graduating valve or the like which controls the force exerted by the motor in proportion to the pressure exerted by the operator on the pedal. Graduating valves are expensive to construct and difficult to maintain, but the smooth operation of booster brakes, is dependent on the smooth and certain action of the graduating valve. These valves have been a prolific cause of trouble and expense. One object of the present invention is to avoid the use of such a valve and thus simplify construction and maintenance, securing the operating characteristics of a simple pedal operated brake, with the high force ratios necessary for heavy vehicles and desirable on even light vehicles.

Generally stated the invention contemplates a braking system or the like which may function as a simple pedal actuated system, with normal pedal travel, normal slack travel and normal force ratio. With this is associated a motor, which is rendered active by initial motion of the pedal, to increase the force ratio between the pedal and the actuated device (brakes in our example).

Where a fluid pressure motor is used, it is controlled by a valve. This valve is not of the graduating type, but merely reverses the motor so that the latter moves back and forth through its range of motion. Furthermore the motor has no brake applying function, and in the preferred embodiments is connected with the brake system through an irreversible drive which protects the motor from braking stresses. This last is not strictly essential, but permits the use of a small light motor.

In most cases it would be impracticable to increase the force ratio without providing some means effective simultaneously to take up the slack, since increase of force ratio implies increased pedal travel. This condition is met by so contriving the force-ratio changing means that it also acts as a slack take-up. Any necessary amount of slack may be taken up, but in braking systems it is preferred that sufficient slack shall be taken up to bring the brakes just to the point of applying.

Initial slight depression of the pedal causes the motor to shift, taking up slack and increasing the force ratio, without producing a brake application. Further depression of the pedal produces an application graduated solely by the force exerted on the pedal. Such application is in theory and in fact a manual and not a power application.

Should the motor fail to function the brakes will be applied manually with the normal (low) force ratio.

While it is desirable that the slack should be completely taken up before the brakes apply, it must be understood that this is a relative term. Under ideal conditions the slack take-up would remove all the slack and bring the brakes just to that point at which they commence to drag. At such time the braking effect would be negligible, but the heating effect would be serious if the brakes were allowed to remain in this condition for a substantial period. The device will function, however, in a useful degree if it takes up somewhat less or a little more than the ideal amount of slack, and the phrase "to take up the slack" is descriptive rather than limiting.

Any reversible motor might be used to operate the slack take-up mechanism. The simplest known to me is a single-acting motor of the expansible chamber type, provided with a return spring which renders the motor reversible. In any expansible chamber motor the piston or other abutment, moves as a result of a pressure differential between its opposite sides. Consequently, a so-called vacuum motor is the approximate equivalent of a pressure motor. It is convenient to use a vacuum motor, (i. e., one operating by the differential between atmospheric pressure and a sub-atmospheric pressure) and to connect its controlling valve to the intake manifold of the Otto cycle gasoline engine customarily used in motor vehicles.

Two embodiments of the invention are illustrated in the accompanying drawings, in which,—

Fig. 1 is a diagrammatic view showing in side elevation the preferred embodiment of the invention connected with a brake pedal and brake band.

Fig. 2 is an enlarged fragmentary view similar to a portion of Fig. 1 and showing the slack take-up motor and its control valve in section. Certain parts are shown in full lines in full release position and in dotted lines in the position assumed when the slack has been taken up and the leverage ratio increased, the brakes remaining substantially released.

Fig. 3 is a fragmentary view looking upward at and showing the arrangement of the toggle linkage.

Fig. 4 is a fragmentary view similar to a portion of Fig. 2, and showing the positions assumed by the parts when the brakes are applied by the foot pedal while the slack take-up motor remains inactive.

Fig. 5 is an enlarged view in elevation showing the substitution of a swinging arm and ratchet clutch in place of the self-locking toggle used in the structure shown in the other figures.

Referring to Figs. 1 to 4 inclusive, and particularly Fig. 1, the brake pedal is indicated at 11 and is intended to be typical of any brake actuator. The foot pedal 11 is pivoted at 12 and is constantly urged in a brake releasing direction by the tension spring 13. Its motion in a releasing direction is limited by an adjustable stop 14, here shown as a stop screw. A clevis 15 adjustably threaded on the end of a pull rod 16 forms a pivotal connection between this rod and the foot pedal 11. The rod 16 enters the housing 17, 18, of a valve mechanism hereinafter described, and is so related to the member 17 as to be capable of exerting tension therethrough. The portion 18 of the housing has an adjustable threaded connection with the pull rod 19. The pull rod 19 is pivoted at 21 to a floating lever 22, which is pivoted at 23 to a clevis 24. The pull rod 25 has an adjustable threaded connection with the clevis 24 and is pivoted at 26 to the swinging end of a guide link 27, whose other end is pivoted at 28 on a bracket carried by the framework of the vehicle. The pivot 26 thus moves in a definite arc.

Passing through the clevis 24 is a stop pin 29 with which the lever 22 engages when the brakes are released and the slack is let out. Since the pivot 26 is guided in a definite arcuate path and since the pull rod 25 is substantially rigid, the arm 22 can act merely as an offset rigidly connecting the rod 19 with the rod 25. Thus the brake pedal 11 may shift the pivot 26 without any force-multiplying leverage other than that inherent in the lever 11. Formed in the clevis is a stop shoulder 30 which limits the swinging movement of the lever 22 in the opposite direction. The purpose of the stop shoulder 30 will be explained hereinafter.

Pull rod 31 is connected to the pivot 26 and is pivoted at 32 to the brake arm 33 which forms a part of the usual toggle mechanism for contracting a brake 34 upon a brake drum 35. The showing of the brake is purely conventional and may be regarded as typical of any brake or other device which it is desired to operate by depression of the pedal 11.

Near the end of lever 22, remote from pivot 21, and beyond pivot 23, is a pivot pin 36 which works in a longitudinal slot 37 in a clevis 38. The purpose of the pin and slot connection is to permit the lever 22 to move bodily in a horizontal direction in the event that the take-up rod 39 on which the clevis 38 is mounted is not actuated by the take-up and the leverage-changing mechanism about to be described. (See Fig. 4.)

This mechanism acts through the rod 39. The end of the rod 39 remote from clevis 38 is formed with a fork 41 which straddles and is pivoted at 42 to two triangular toggle plates 43 which are spaced apart and supported on a common journal pin 44 projecting from opposite sides of the bracket 45. Stops 40 are provided to limit the swinging motion of the toggle plates in a clockwise direction.

The bracket 45 is mounted on a cap or cover 46 of a pneumatic motor. The main housing or body of the pneumatic motor is indicated at 47 and is fixedly supported on a portion of the framework of the vehicle (not shown) by means of a flange 48.

The body 47 and cap 46 have chamber portions of generally conical form and have peripheral flanges by which they are connected. The connections comprise a plurality of bolts 49 which pass through the flanges and also through an interposed flexible diaphragm 51. The cover 46 has a central aperture as shown, and through this extends a pull rod 52 which is connected to the center of the diaphragm 51 by means of the washers and nut, clearly indicated in Fig. 2. The outer end of the pull rod 52 extends between and is pivoted at 53 to the two toggle plates 43 (see Fig. 3).

The diaphragm 51 is urged outward by a coiled compression spring 54 which reacts between the end portion of rod 51 and a seat formed in the housing 47, as clearly shown in Fig. 2. The space to the right of the diaphragm 51 is freely open to the atmosphere while the space to the left of the diaphragm is connected by a flexible hose 55 with the portion 17 of the valve housing, already mentioned.

The function of the valve mechanism is to connect the space at the left of the diaphragm 51 selectively with the atmosphere or with some space maintained at sub-atmospheric pressure. The portions 17 and 18 of the valve housing combine to enclose a valve chamber 56. The rod 16 extends through an opening, into the chamber, and terminates in an enlarged head 57 which functions as a valve. When the rods 16 and 19 are stressed in tension the valve head 57 prevents withdrawal of rod 16 from the housing 17, and thus serves as a tension connection as well as a valve.

The atmospheric communication to the valve chamber 56 is offered by clearance around the pull rod 16. A valve seat 58, which I call the atmospheric valve seat, controls flow through this clearance. With this seat the valve head 57 coacts when the rods 16 and 19 are stressed in tension. Opposed to seat 58 is the sub-atmospheric seat 59 toward which the valve head 57 is constantly urged by a coiled compression spring 61.

The seat 59 controls flow through the passage 62. Communicating with the passage 62 is a flexible hose connection 63 leading to any space maintained at sub-atmospheric pressure, for example, the intake manifold of a gasoline engine operating on the Otto cycle.

It is customary to include in brake rigging, some sort of a releasing spring, and as typical of this, spring 65 is indicated as applied to the guide link 27. It is immaterial to the present invention how such spring is arranged, provided that it, or its equivalent, shall function to draw rod 19 in a brake releasing direction, with sufficient force to ensure that spring 61 will be over-powered upon initial depression of pedal 11.

At any time when there is no sub-atmospheric pressure available, for example, when the engine is not running, the brakes may be applied by depressing the brake pedal 11. In this case rocking motion of the lever 22 is prevented by collision with the stop 29. Under such conditions the foot pedal can apply the brakes with the same degree of force as is now secured with conventional foot brakes.

Initial depression of pedal 11 will shift the valve head 57 from the sub-atmospheric seat 59 to sealing engagement with atmospheric seat 58. If the passage 62 is at sub-atmospheric pressure, as normally it is, the effect of such shifting of the valve is to isolate the space at the left of diaphragm 51 from atmosphere and connect it to sub-atmospheric pressure. Consequently, atmospheric pressure, acting on the outer or right hand side of the diaphragm 51, forces the diaphragm to the left against the resistance of spring 54. This turns the toggle plates 43 from the full line position shown in Fig. 2 to the dotted line position against stops 40. Motion to this position shifts the pivot 42 far enough to carry the line of pull of link 39 beyond the center line of pivot 44. Consequently the toggle plates will be drawn into thrust engagement with the stop 40 by tension exerted on rod 39, and thereafter the braking stress is resisted by the toggle plates and stops and not by the motor.

The effect of the shifting of the toggle plates 43 is to draw the lower end of lever 22 to the left, as indicated in dotted lines in Fig. 2. This involves such angular displacement of the lever 22 as to carry it free of the stop 29 and into contact with the stop shoulder 30, so that the lever 22 can now serve as a multiplying lever interposed between the pull rods 19 and 25, when the rod 19 is drawn to the left.

This can be explained with reference to Fig. 2 by first assuming that diaphragm 51 remains inert when the pedal 11 is depressed. In such case the toggle plates 43 are not shifted but remain in the full line position of Fig. 2. Rod 19 holds member 22 against stop 29, so that rod 25 is drawn forward, just as it would be if it were a rigid continuation of rod 19. Slot 37 permits the travel of pin 36. (See Fig. 4.) Such action would occur for example, if the engine were not running.

Normally, however, upon initial depression of the pedal 11, diaphragm 51 is drawn to the left, shifting the toggle plates 43 to the dotted line position of Fig. 2. This draws rod 39 forward, shifting pin 36 to a position in which this pin becomes a substantially fixed fulcrum for the lower end of member 22 which now becomes a lever. Further depression of pedal 11 draws rod 19 and consequently the upper end of member 22 forward. Rod 25 is now pivoted to member 22 at 23. Since the distance 36—21 is several times the distance 36—23 the member 22 becomes a force multiplying lever.

Within reasonable limits the multiplication can be any amount desired, but, in the example illustrated, slightly exceeds four to one. In other words, the motor diaphragm 51 not only takes the slack up and brings the brakes to the point of application, but it also increases the leverage ratio from the pedal 11 to the arm 33 more than four fold. The effect is to permit heavy applications to be made with light pressure on the pedal and to permit the application to be graduated on and off positively by variation of pedal pressure.

In releasing, and just before the pedal 11 reaches the stop 14, sufficient slack will be afforded for the spring 61 to shift the valve back to the position shown in Fig. 2. This will admit atmospheric air to the space at the left of the diaphragm 51 and the parts will be restored to the initial or full line position of Fig. 2.

In this action the stop 30 plays a vital part. With the valve motor active and brakes released (see the dotted line position of Fig. 2), rod 25 is under the tension necessary to hold the slack. If it delivered this stress to rod 19, the valve 57 would be held in slack take-up position. Stop 30 by limiting the swinging motion of lever 22, delivers the pull of rod 25 exclusively to link 39 and so positions pivot 21 that valve 57 will be shifted by the final motion of pedal 11 in a releasing direction.

While I prefer the toggle mechanism described because it is self-locking and peculiarly simple, other arrangements are possible, and one such is shown in Fig. 5.

It will be understood that the brake system, as a whole, is unchanged. Only the take-up mechanism directly operated by the pneumatic motor is modified. The link 39 is essentially identical with that already described. The motor mechanism is essentially identical with that already described except that instead of the bracket 45, there is a bracket 71 upon which is mounted a large journal 72. Swiveled on this journal is a rock arm 73 which is pinned at 74 to the forked end of pull rod 39. A portion of the bearing surface in the member 73 which encircles the journal 72 is cut away to form a tapered slot having a straight side 75. Mounted in this slot between the journal 72 and the inclined surface 75 is a clutch roller 76 which is urged toward the narrow end of the slot by a coiled compression spring 77 confined in a pocket formed in the member 73.

The rod 52 of the motor is forked, as before described, the fork straddling the member 73 and having a pivot pin 78 which passes through the narrow end of the slot in the member 73. When the rod 52 is drawn inward the pin 78 moves to the narrow end of the slot and releases the roller 76 which is then urged into clutching position by the compression spring 77.

Continued inward motion of the rod 52, after it reaches the end of the slot, rotates the member 73 counterclockwise on the journal 72, and the wedging action of the clutch roller 76 precludes retrograde motion. Consequently when the diaphragm 51 is drawn to the left, the rod 39 is pulled to take up the slack in the brake rigging and change the angular position of the lever 22, the effect being identical with that described in connection with Figs. 1 to 4.

The clutch roller 76 takes the pull exerted in applying the brakes and relieves the motor of this stress. When the brake pedal returns to release position and shifts the valve 57 the diaphragm 51 moves to the right, the pin 78 strikes and disengages the clutch roller 76, member 73 rotates clockwise, and the slack is released. Such release of slack is accompanied by the restoration of the low leverage ratio, as heretofore explained.

In certain of the claims I shall use the term "force ratio" in lieu of the term "leverage" to define the ratio of force developed at the brake band to the force applied at the brake pedal, the purpose being to express the invention in terms of the mechanical effect and to avoid implied limitations to linkages or lever mechanisms. I shall also use the word "link" as a general descriptive term for members such as the brake rods.

What is claimed is,—

1. The combination of a brake; an actuator; a connection through which the actuator may apply the brake with a relatively low force ratio and substantial slack travel; motor means rendered operative, by initial motion in brake applying direction, to increase said force ratio and take up slack without applying the brake, and rendered operative by final motion in a releasing direction to restore the low ratio and the slack; and means for preventing said actuator from moving said motor when the brakes are being applied with relatively low force ratio and substantial slack travel.

2. The combination of an operator-operated member; force transmitting means through which said member may react upon an operated device with a normal force ratio; a shiftable element for changing said ratio; a clutch for resisting motion of said element; a reversible motor operatively related to said element and clutch and acting first to control the clutch and then shift the element; and a controller for reversing said motor, said controller being operable in relatively reverse senses by reverse movements of said member near one limit of such member's motion.

3. The combination of an operator-operated member; force transmitting means through which said member may react upon an operated device with a normal force ratio, said means affording slack travel and including a shiftable element which when shifted increases said ratio and reduces said slack; a clutch for resisting motion of said element; a reversible motor operatively related to said element and clutch and acting first to control the clutch and then shift the element; and a controller for reversing said motor, said controller being operable in relatively reverse senses by reverse motions of said member near one limit of such member's motion.

4. The combination of an operator-operated member; force transmitting means through which said member may react upon an operated device with a normal force ratio; a shiftable element for changing said ratio; a one-way clutch for resisting retrograde motion of said element; a reversible motor having a lost motion connection with said element and operatively related with said clutch to engage and disengage the same by such lost motion; and a controller for reversing said motor, said controller being operable in relatively reverse senses by reverse movements of said member near one limit of such member's motion.

5. The combination of an operator-operated member; force transmitting means through which said member may react upon an operated device with a normal force ratio; motor means rendered operative by initial motion of said member to change said force ratio; and means for protecting said motor means from stress developed in said force transmitting means.

6. The combination of an operator-operated member; force transmitting means through which said member may react upon an operated device, said means affording slack travel and including a pivot shiftable to increase the force ratio and reduce such slack; reversible motor means for shifting said pivot; a controller for reversing said motor, said controller being operable in relatively reverse senses by reverse movements of said member near one limit of such member's motion; and means for protecting said motor from stress developed in said force transmitting means.

7. The combination of a brake; an actuator; a connection through which the actuator may apply the brake with a relatively low force ratio and substantial slack travel; motor means rendered operative, by initial motion in brake applying direction, to increase said force ratio and take up slack without applying the brake, and rendered operative by final motion in a releasing direction to restore the low ratio and the slack; and means comprising a one-way force transmitting connection for preventing said actuator from moving said motor when the brakes are applied with a relatively low force ratio and substantial slack travel.

8. The combination of a brake; an actuator; a connection through which the actuator may apply the brake with a relatively low force ratio and substantial slack travel; and motor means rendered operative, by initial motion in brake applying direction, to increase said force ratio and take up slack without applying the brake, and rendered operative by final motion in a releasing direction to restore the low ratio and the slack, said motor means comprising a fluid pressure motor and a self-locking member shiftable thereby.

9. The combination of a brake; an actuator; a connection through which the actuator may apply the brake with a relatively low force ratio and substantial slack travel; and motor means rendered operative, by initial motion in brake applying direction, to increase said force ratio and take up slack without applying the brake, and rendered operative by final motion in a releasing direction to restore the low ratio and the slack, said motor means comprising a fluid pressure motor and a toggle straightened and broken thereby, the toggle serving to protect the motor from stress during the brake application.

10. The combination of an operator operated member; force transmitting means through which said member may react upon an operated device with a normal force ratio, said transmitting means permitting slack travel and including an element shiftable through a definite range to take up such slack and increase said force ratio; and motor means connected to shift said element and comprising a fluid pressure motor and a toggle straightened and broken thereby, the toggle serving to protect the motor from stress exerted through said member, said motor means being rendered operative by initial motion of said member to increase said force ratio and take up slack and by final return motion of said member to restore said element to its initial position.

11. The combination of an operator operated member; force transmitting lever mechanism through which said member may react upon an operated device with a normal force ratio, said lever mechanism affording slack travel and including a mechanism of the toggle type interposed in the lever mechanism, said toggle mechanism having two positions, in one of which the slack is reduced the force ratio is increased and the toggle mechanism is locked against stresses exerted by said member; a reversible motor movable through its entire permissible stroke to shift said toggle mechanism between said positions; and means for reversing said motor, operable by said member as the latter moves reversely near one limit of its motion.

12. The combination of an operator-operated member; force transmitting means through which said member may react upon an operated device with a normal force ratio, said means including a floating element angularly displaceable to a position in which it acquires the function of a force multiplying lever, and a stop with which the element normally coacts to form a non-multiplying connection; a reversible motor connected to shift said floating element between said two positions; a controller for reversing said motor, said controller being interposed in said force transmitting means between said member and said floating element, said controller being operable in relatively reverse senses by reverse movement of said member near one limit of said member's motion; and a second stop adapted to limit the displacement of said element from the first-named stop.

WILLIAM G. WALL.